United States Patent [19]
Kageyama

[11] Patent Number: 5,860,356
[45] Date of Patent: Jan. 19, 1999

[54] SYSTEM FOR PRODUCTION OF STERILE-PACKED RICE

[75] Inventor: Genzaburo Kageyama, Sugito-machi, Japan

[73] Assignee: Shinwa Kikai Co., Ltd., Saitama, Japan

[21] Appl. No.: 736,160

[22] Filed: Oct. 25, 1996

[30] Foreign Application Priority Data

Oct. 25, 1995 [JP] Japan .................................. 7-299298

[51] Int. Cl.⁶ ...................................................... A23L 1/10
[52] U.S. Cl. ................................ 99/330; 99/356; 99/360; 99/407; 99/483; 99/516; 99/536
[58] Field of Search ............................ 99/326–331, 371, 99/352–356, 359–361, 403–407, 516, 534–536, 470, 483; 53/451, 551, 552, 471, 474, 430, 461; 422/22, 39; 426/115, 118, 124, 316, 326, 395, 410, 521, 523

[56] References Cited

U.S. PATENT DOCUMENTS

| | | | |
|---|---|---|---|
| 4,059,919 | 11/1977 | Green ......................................... | 99/356 |
| 4,571,341 | 2/1986 | Sugimura .............................. | 99/404 X |
| 4,607,495 | 8/1986 | Fujimoto et al. ..................... | 99/537 X |
| 4,649,055 | 3/1987 | Kohlwey ............................... | 426/521 X |
| 4,677,907 | 7/1987 | Weibye .................................... | 99/483 |
| 4,866,232 | 9/1989 | Stone ................................... | 99/403 X |
| 4,882,188 | 11/1989 | Sawada et al. ........................ | 99/470 X |
| 5,069,923 | 12/1991 | Hubbard et al. ...................... | 99/356 X |
| 5,130,153 | 7/1992 | McIlroy et al. ........................ | 99/330 X |
| 5,241,149 | 8/1993 | Watanabe et al. .................... | 426/410 X |
| 5,355,777 | 10/1994 | Chen et al. ............................. | 99/403 X |
| 5,370,042 | 12/1994 | Tolchin et al. ........................ | 99/407 X |
| 5,587,194 | 12/1996 | Nakatani et al. ....................... | 426/521 |

FOREIGN PATENT DOCUMENTS

| | | |
|---|---|---|
| 3155761 | 7/1991 | Japan . |
| 3201954 | 9/1991 | Japan . |
| 5137523 | 6/1993 | Japan . |
| 5176696 | 7/1993 | Japan . |
| 5304910 | 11/1993 | Japan . |
| 5316969 | 12/1993 | Japan . |
| 5316970 | 12/1993 | Japan . |
| 6022709 | 2/1994 | Japan . |
| 6022711 | 2/1994 | Japan . |
| 6046770 | 2/1994 | Japan . |
| 6070709 | 3/1994 | Japan . |
| 6078698 | 3/1994 | Japan . |

*Primary Examiner*—Timothy F. Simone
*Attorney, Agent, or Firm*—Dann, Dorfman, Herrell and Skillman, P.C.

[57] ABSTRACT

A sterile-packed rice product is produced in a system including a rice filling device that fills an individual tray with a predetermined quantity of washed and soaked rice; a sterilization chamber that substantially air-tightly contains one or more of arrays of the trays with rice for sterilizing the rice with high-temperature pressurized steam introduced into the chamber; a water filling device that fills the trays with the sterilized rice with a predetermined quantity of water necessary for steam rice-cooking; a steam rice cooker that cooks the rice with a steam; and a sealing device that lids air-tightly that trays with the cooked rice. A clean booth surrounds a conveyor conveying the trays from the steam rice cooker to said sealing device, thus providing a predetermined cleanliness over an area covering at least a conveying path of the trays from an exit of the steam rice cooker to the sealing device. An intermittent conveyor is preferably used to intermittently conveys the arrays of the trays throughout the rice filling device and the sterilization chamber. Preferably, high temperature pressurized steam is intermittently flushed into the sterilization chamber for sterilization of the packed rice.

5 Claims, 3 Drawing Sheets

FIG. I

SYSTEM FOR PRODUCTION OF STERILE-PACKED RICE

BACKGROUND OF THE INVENTION

The present invention relates to a system for production of sterile-packed rice, which is capable of substantially completely eliminating any thermo-resistant bacteria that could remain in rice.

Rice has been known as one of the most healthy foods and taken as the staple food or side-dish ingredient in many countries in the world. Recent consumer lifestyles and dining styles have changed the rice industry environment. In other words, the conventional custom of cooking rice as a domestic work has, at least in part, shifted to the recent trend of buying processed rice products.

Retort-pouch foods have become popular as typical one of processed or pre-cooked foods. A retort-pouch food can be produced by packaging and sealing a processed food in a tray or package and then sterilizing the packed food in a high temperature, high pressure atmosphere. It has been known that when the food temperature rises to above approximately 130° C., any thermo-resistant bacteria that could contain in the food is eliminated substantially perfectly.

However, since heat is transmitted gradually from the peripheral area to the center of the food while the food is subjected to retort sterilization, when the food center reaches a temperature of the order of 130° C., its peripheral area must have much higher temperature, resulting in deterioration of natural food flavor. On the other hand, retort sterilization with a lower temperature prevents flavor deterioration but does not provide a sufficient sterilization because the food center could not reach a predetermined temperature.

Thus, retort-pouch rice can not meet the requirement of perfect sterilization without flavor deterioration. Various attempts have been directed to production of sterile-packed rice that satisfies the above requirements. For example, Japanese patent laid-open publication No. 3-155761 published on Jul. 3, 1991 and Japanese patent laid-open publication No. 3-201954 published on Sep. 3, 1991 disclose sterile-packed rice production system comprising sterilizing a large quantity of washed rice by a high temperature steam, followed by cooking, and packaging and sealing the cooked rice into a plurality of small-size, individual packages. Packaging and sealing operation is carried out in a sterile atmosphere, that is, in a clean room of cleanliness of 100–1000 class. The packages and lids are in advance sterilized by ultraviolet light.

With this system, a huge clean room is needed for packaging and sealing operation. It is laborious and costly to create and maintain a predetermined cleanliness for such a huge clean room. Moreover, workers' hands and clothes must be cleaned or sanitized each time when they go into and out of the clean room, which greatly degrades operation efficiency and increases production cost.

OBJECT AND SUMMARY OF THE INVENTION

It is therefore an object of the present invention to overcome the shortcomings of prior art sterile-packed rice production technologies.

Another object of the present invention is to provide a novel system for production of sterile-packed rice that provides complete sterilization effect without deterioration of natural rice flavor.

In accordance with the present invention there is provided a system for production of sterile-packed rice comprising; a rice filling device that fills an individual tray with a predetermined quantity of washed and soaked rice; a sterilization chamber that substantially air-tightly contains one or more of arrays of said trays with rice for sterilizing the rice with high-temperature pressurized steam introduced into said chamber; a water filling device that fills said trays with the sterilized rice with a predetermined quantity of water necessary for steam rice-cooking; a steam rice cooker that cooks the rice with a steam; a sealing device that lids air-tightly said trays with the cooked rice; a conveyor that conveys said trays from said steam rice cooker to said sealing device, and a clean booth that surrounds said conveyor to provide a predetermined cleanliness over an area covering at least a conveying path of said trays from an exit of said steam rice cooker to said sealing device.

According to a preferred embodiment of the present invention, there is further provided an intermittent conveyor that intermittently conveys the arrays of trays throughout said rice filling device and said sterilization chamber. In this embodiment, a predetermined number of trays come to a standstill each time between preceding and succeeding conveyance for a predetermined period, during which rice filling operation by the rice filling device and/or sterilization operation in the sterilization chamber can be effected.

Preferably, high temperature pressurized steam is intermittently flushed into the sterilization chamber for sterilization of the packed rice. For example, one packed rice is subjected to flush of high temperature pressurized steam over a period of 5 to 10 seconds that is repeated 6 to 8 times. This reduces a total period of time for sterilization, thus preventing flavor deterioration, but achieves a sufficient sterilization effect to substantially completely eliminate any thermo-resistant bacteria that could contain in rice.

BRIEF DESCRIPTION OF THE DRAWINGS

The above and other objects, features and advantages of the present invention will become apparent from the following description when read in conjunction with the accompanying drawings, in which.

DETAILED DESCRIPTION OF THE PREFERRED EMBODIMENTS

Figure 1:
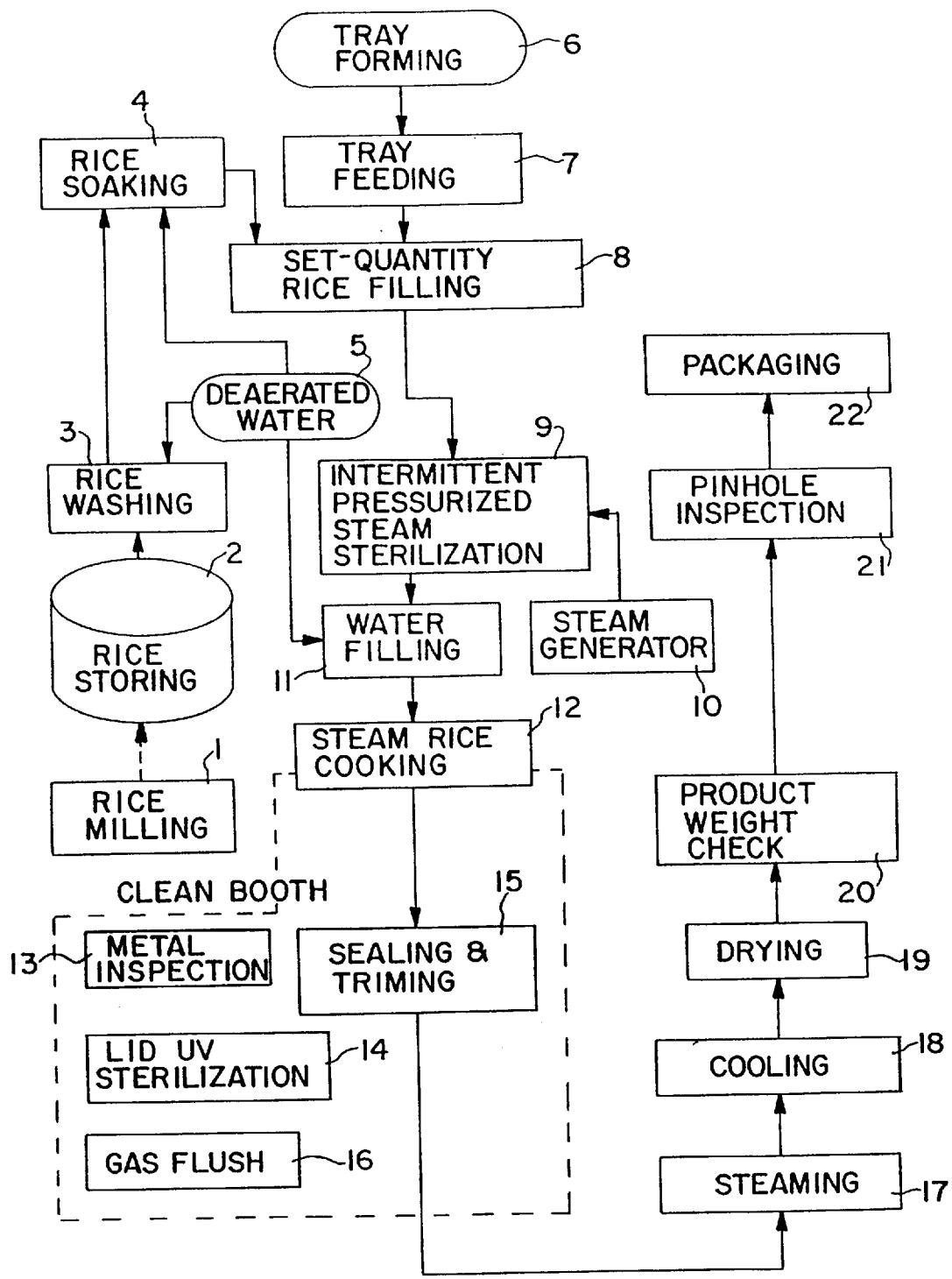
FIG. 1 is a flowchart illustrating production of sterile-packed rice in accordance with the features of the present invention.

Referring specifically to the flowchart of FIG. 1, a large quantity of rice is cleaned and polished by a rice mill (1) and then stored in a storage tank (2). When rice in the storage tank is used to produce sterile-packed rice in accordance with the streamlined system of this invention, rice is pretreated by washing (3) and soaking (4) with deaerated water (5) to have water content of 10–30%, and then packed individually and separately into a plurality of trays. Trays are formed from plastic or other suitable material on-line or off-line (6) and successively supplied (7) to a rice-filling station where each tray is filled with a predetermined small quantity of rice (8). The surface of rice in tray is preferably leveled by a known leveling device.

Tray filled with rice is thrown into a closed chamber in which rice and tray are subjected to high temperature pressurized steam for sterilization (9). Sterilization should be effected by pressurized steam having a temperature of at least 100° C., preferably of 130°–140° C., so that any thermo-resistant bacteria that could remain in rice can be destroyed rapidly, say in scores of seconds. Steam is supplied from a steam generator (10), preferably at a pressure of 2.7–3.0 kgf/cm$^2$. Sterilization operation in high temperature pressurized steam also facilitates alpharization of rice starch, which contributes to increase of rice flavor and reduction of rice cooking period.

In a preferable embodiment of the present invention, an intermittent conveyor is provided through the rice-filling station and the succeeding sterilization station. More particularly, the conveyor carries a plurality of transverse arrays or rows of trays, each row including a plurality of trays. The conveyor is driven to intermittently run and stop respectively at predetermined even pitches and intervals. When a specific row of vacant trays reach the rice-filling station, the conveyor makes a brief stop for a predetermined period during which each vacant tray is filled with a predetermined quantity of washed and soaked rice. The row of the rice-filled trays leave from the rice-filling station and advances toward the sterilization station or chamber that extends in a direction of conveyance and can therefore hold a number of tray rows. While one row of the rice-filled trays pass through the chamber, the conveyor makes several brief stops, each for a predetermined period, so that the packed rice is repeatedly subjected to several-time sterilization caused by high temperature pressurized steam.

Figure 2:
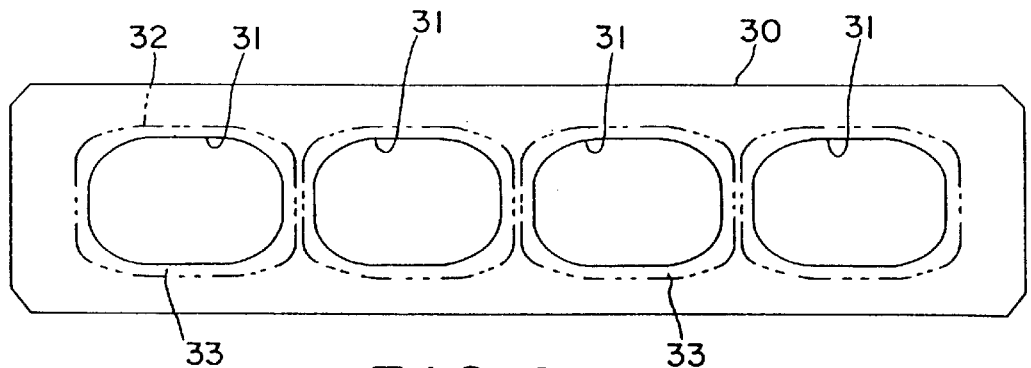
FIG. 2 is a plan view of a tray-carrying plate that can be used in connection with a tray conveying system.

FIG. 2 shows an example of a tray-carrying plate 30 that carries a predetermined number of trays and, in turn, is carried by the conveyor in a widthwise direction. In this example, plate 30 has four openings 31 of size corresponding to and slightly smaller than an outer periphery of a tray 32. An open top of the tray 32 has an outward extending flange 33 that may lie on the plate 30, around the opening 31, so that the plate 30 carries four trays 32.

Figure 3:
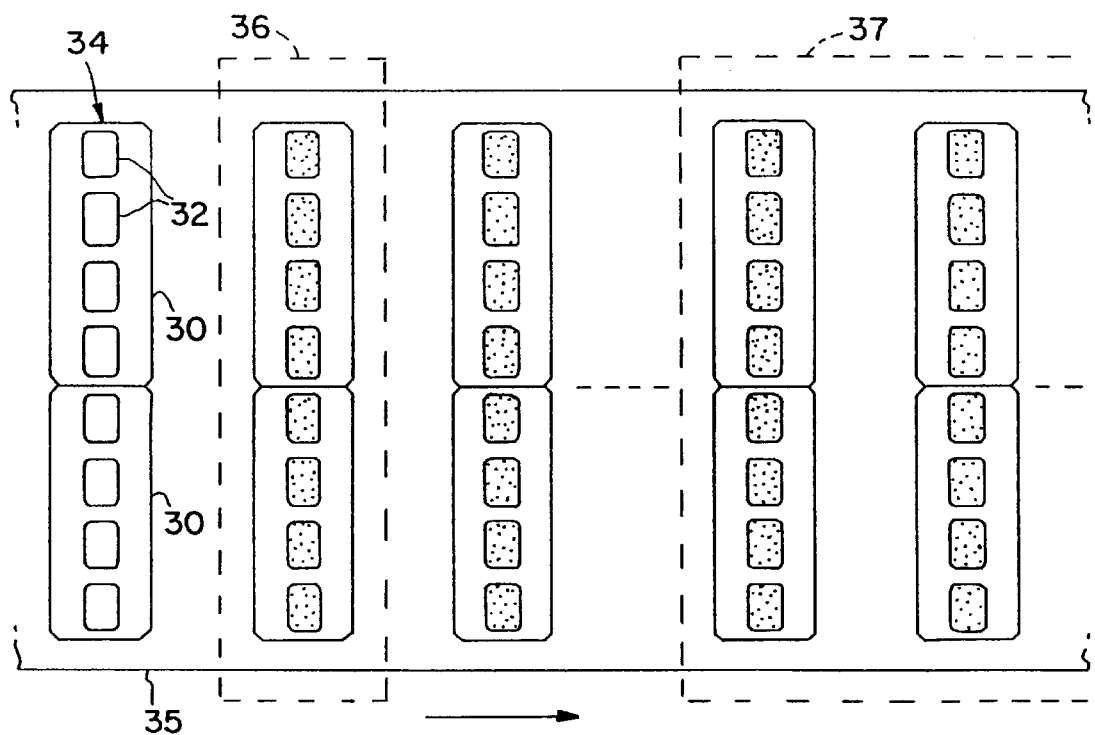
FIG. 3 is a plan view diagrammatically illustrating a tray conveying system that conveys successively a plural rows of trays, each tray row being supported on the plate shown in FIG. 2, through a rice-filling station and a sterilization chamber.

The tray carrying plates 30 are placed on an intermittent conveyor 35, as shown in FIG. 3. More particularly, two plates 30, each carrying four trays 32, are connected in a lengthwise direction to form an elongated plate 34 carrying eight trays 32 in total. The elongated plates 34 are placed on the intermittent conveyor 35 in crosswise direction, side-by-side, with small intervals between adjacent two plates. Thus, transverse rows of eight trays 32 are moved periodically in an arrowed direction as the conveyor 35 is driven intermittently. Trays 32 are fed (7) to the elongated plate 34 before it enters a rice-filling station 36. A predetermined quantity of rice is fed (8) to the respective trays 32 on the elongated plate 34 that is standstill within the rice-filling station 36 during a predetermined period brief stop of the intermittent conveyor 35. Namely, rice-filling operation is carried out intermittently in synchronism with intermittent stops of the conveyor 35.

As the conveyor 35 further moves, the elongated plate 34 carrying eight trays 32 filled with a predetermined quantity of rice leaves the rice-filling station and enters a sterilization chamber 37. The sterilization chamber 37 extends in a direction of conveyance to hold a predetermined numbers of the elongated plates 34. Thus, every elongated plates 34 makes the same numbers of stops within the sterilization chamber, each for a predetermined period, during which a flush of high temperature pressurized steam is introduced into the sterilization chamber 37 and then discharged to the atmosphere. In this way, rice filled in the respective trays 32 on the elongated plate 34 can be repeatedly subjected to high temperature steam flush in the sterilization chamber 37.

Sterilization should preferably be carried out by repeatedly and intermittently applying several-time flushes of high temperature pressurized steam to rice packed in the trays. For example, application of a flush of high temperature pressurized steam over 5–10 minutes is repeated 6–10 times. As above described in reference to FIG. 3, arrangement of the intermittent conveyor 35 through the sterilization chamber 37 is particularly suitable to such repeated application of steam flush to rice during conveyance of the tray rows inside the sterilization chamber 37. One steam flush applying operation is completed within one periodic stop of the intermittent conveyor 35. The running rate of the conveyor 35 and the length of the sterilization chamber 37 determine the maximum times of repetition of steam flush applying operation. During inoperating intervals between two steam flush applications, the conveyor 35 runs to convey the tray rows on the elongated plate 34 toward the steam rice cooker. After being subjected to repeated sterilization operation by high temperature pressurized steam flush, the elongated plate 34 leave the sterilization chamber, as the conveyor 35 advances.

Each tray row is periodically but successively introduced into the steam rice-cooking vessel where a predetermined quantity of cold or hot water is poured into the tray (11) and rice in the tray is cooked with steam in a known manner (12). Water is preferably deaerated and sterilized, in advance. Water may have a controlled pH value, if necessary. When the system is designed to produce some kind of rice food products mixed with red beans or other edible ingredients, necessary ingredients, seasonings and colorants are charged into the trays before cooking with steam.

Figure 4:
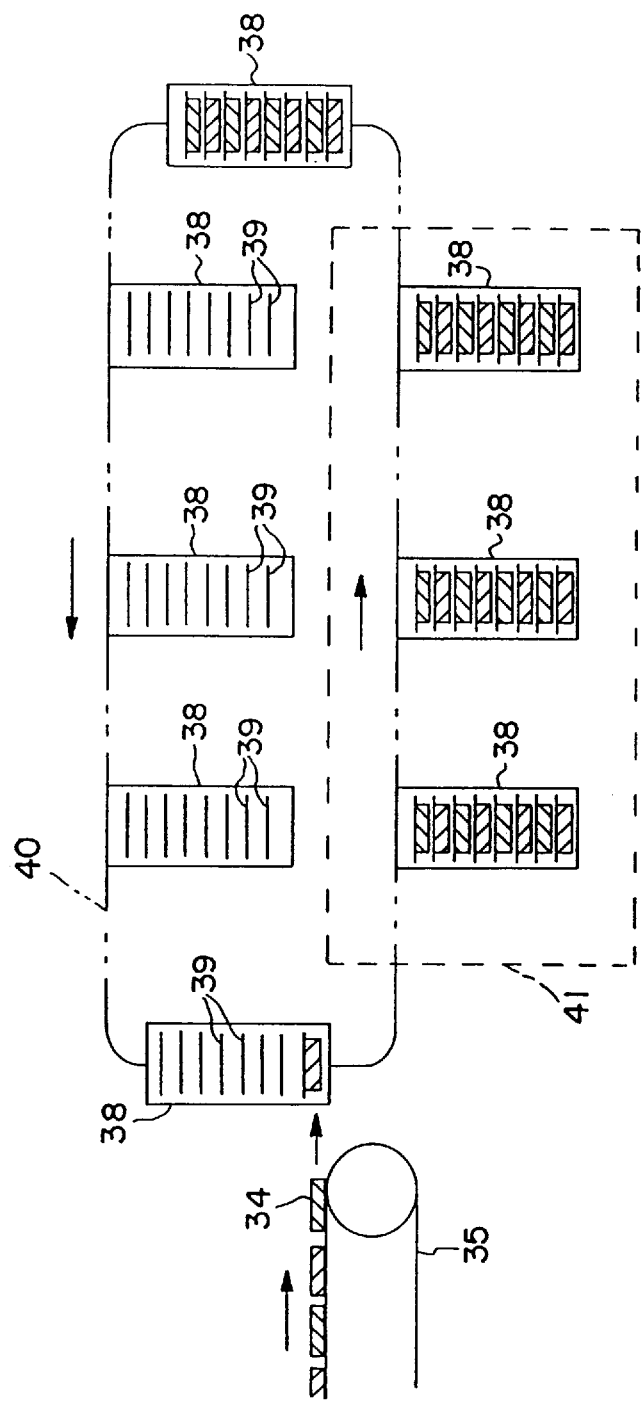
FIG. 4 is a diagram illustrating a preferred example of a conveyor equipment to be used in the sterile-rice production system of the present invention, particularly in connection with a steam rice-cooking vessel.

In a preferred embodiment of the present invention, a circulating multi-nacelle conveyor system is installed in connection with the rice-cooking vessel. As shown in FIG. 4, when the elongated plate 34 carrying the trays 32 with the sterilized rice reaches the forward end of the intermittent conveyor 35, it is transferred to one of nacelles of the circulating conveyor 40. More particularly, the conveyor 40 comprises a plurality of tray-carrying nacelles 38, each nacelle having a plurality of vertically stacked, spaced racks 39 that respectively can carry a predetermined number of trays 32. For example, without limitation, the conveyor 40 comprises eight nacelles 38, each nacelle carries eight racks 39, and each rack holds eight trays 32. The nacelles 38 are connected and suspended, at even spacing, to an endless circulating drive mechanism 40 and, therefore, circulates something like a Ferris wheel.

In a particularly preferred embodiment, to facilitate transfer of the trays 32 from the preceding conveyor 35 running through the rice-filling station 36 and the sterilization chamber 37, the nacelle-type conveyor 40 is circulated intermittently in synchronism with the conveyor 35. Also, each rack 39 of the nacelle conveyor 40 is preferably designed to hold the same number of trays 39 as in the tray rows on the conveyor 35. The rack 39 is preferably designed to hold the same number of trays as in the tray rows on the conveyor 35 running through the rice-filling station 36 and the sterilization chamber 37, which makes it smooth and easy to transfer the tray 32 from the conveyor 35 to the nacelle-type conveyor 40 circulating in a rice-cooking vessel 41. Therefore, the rack 39 may be the same as the elongated plate 34 conveyed by the intermittent conveyor 35.

There are different four stages during circulation of a nacelle 38. At the first stage, the nacelle 38 with vacant racks 39 is intermittently driven to descend at a location in vicinity to the forward end of the conveyor 35 that has passed through the sterilization chamber 37. During descent of the nacelle 38, the tray rows on the conveyor 35 are transferred to the nacelle 38. Transfer of the tray rows or the elongated plate 34 is effected first to the lowermost rack and then successively to the upper-level racks. In the above-described non-limitative example, all of eight racks 39 are filled with eight trays respectively, after synchronized movement of eight-pitch advance of the conveyor 35 and eight-pitch circulation or descent of the nacelle conveyor 40.

Then, the nacelle 38 with the tray-filled racks 39 enters the second stage, that is the rice-cooking vessel 41. Rice in the respective trays is cooked with steam while the nacelle 38 moves within the vessel, for a predetermined period, say approximately 30 minutes. The vessel 41 may be divided into several zones, along the path of conveyance of the nacelles 38. This makes it possible that several zones are independently controlled to have different inside temperatures deemed to be suitable to different stages of rice-cooking.

When the nacelle 38 passes through the rice-cooking vessel 41, it enters the third stage in which the trays with the cooked rice are transferred to another conveyor (not shown) that conveys the trays 32 individually toward post-cooking stations.

After all trays 32 in the nacelle 38 has been transferred to the conveyor at the third stage, the nacelle 38 carrying vacant racks 39 is returned to the first stage where it is again ready to receive the tray rows or the elongated plate 34 from the conveyor 35. This feedback movement of the empty nacelle 38 is made at the final stage.

While the trays are individually conveyed by the succeeding conveyor (not shown), they are first subjected to metal inspection (13) so that inferior products containing metallic components are eliminated from the manufacturing line. The trays are then successively thrown into a sealing device wherein an open top of the tray is conveyed with an ultraviolet-sterilized lid (14) to proved an air-tight condition in the tray, and then an unnecessary peripheral portion of the lid is cut away by a trimming device (15).

To prevent secondary contamination of rice that could be caused when the trays go out of the rice-cooking vessel and before they are completely sealed by lids, it is important to provide a clean booth surrounding at least a conveying path of the trays from an exit of the rice-cooking vessel to the sealing device, as shown in FIG. 1. The clean booth preferably provides a cleanliness of 100–1000. For instance, a tunnel-like air-tight booth is provided to surround the conveyor in an area between the exit of the steam rice-cooking vessel and the sealing device, and a clean air generator is installed beneath the roof of the booth at a location substantially in the middle of the entire length of the booth for continuously supplying and filling a clean air throughout the interior of the booth.

Before sealing the tray, an inert gas such as nitrogen may be flushed or introduced into the tray (16). Although the system of the present invention provide a sufficient sterilization effect without use of any free-oxygen absorber or deoxidizer, it is of course possible to put a deoxidizer in the package to maintain rice in a sterile condition for a longer period of time. The deoxidizer may be attached to the backside of the lid or placed on an intermediate sheet stretched above the rice surface and below the lid.

After the tray is sealed, as is known in the rice cooling technology, the cooked rice is steamed for a predetermined period (17) to minimize a difference in water absorption rate of the upper and lower layers of the cooked rice, as well as to facilitate alpha-oxidization of rice starch. It is preferable to invert the tray up-side down before entering the steamer, which improves uniformity of water content throughout the packed rice. After being steamed, the tray passes through a cold water vessel so that the packed rice is cooled to a room temperature (18). In a preferable embodiment, both the steamer and the cold water vessel employ the multi-stage nacelle of the type described in connection with the steam rice-cooking vessel, in which case steaming and cooling operation can be performed with high efficiency and productivity.

After the tray leaves from the cold water vessel, the inverted tray is returned to the original posture, and transferred, in a line, by a belt conveyor of a known type. While the tray is transferred by the belt conveyor, it successively passes through post-treatment equipment including a drying equipment that dries a wet product packed therein (19), a weight checker that weighs the dried product (20), and a pinhole inspecting equipment that detects presence of any pinhole in the product (21). Any inferior product is removed from the conveyor line. The products produced and treated in good order are packed up for shipment (22).

In a test example, the packed rice products were produced in accordance with the above-described product line and proved to have thermo-resistant bacteria content of less than 300/g after cultivation using plane agar medium, which means that the products should be entitled to be called substantially completely sterile-packed rice products.

Although only a single or few exemplary embodiments of this invention have been described in detail above, those skilled in the art will readily appreciate that many modifications and variations are possible in the exemplary embodiments without materially departing from the novel teachings and advantages of this invention. Accordingly, all such modifications are intended to be included within the scope of this invention as defined in the appended claims.

What is claimed is:

1. A system for production of sterile-packed rice comprising:
   a. a rice filling device that fills an individual tray with a predetermined quantity of washed and soaked rice;
   b. a sterilization chamber that substantially air-tightly contains one or more of arrays of said trays with rice for sterilizing the rice with high-temperature pressurized steam introduced into said chamber;
   c. a water filling device that fills said trays with the sterilized rice with a predetermined quantity of water necessary for steam rice-cooking;
   d. a steam rice cooker that cooks the rice with a steam;
   e. a sealing device that applies air-tight lids to said trays with the cooked rice;
   f. a conveyor that conveys said trays from said steam rice cooker to said sealing device; and
   g. a clean booth that surrounds said conveyor to provide a predetermined cleanliness over an area covering at least a conveying path of said trays from an exit of said steam rice cooker to said sealing device.

2. A system as claimed in claim 1 which further comprises an intermittent conveyor that intermittently conveys the arrays of said trays throughout said rice filling device and said sterilization chamber.

3. A system as claimed in claim 2 wherein a predetermined number of said trays come to a standstill each time between preceding and succeeding conveyance for a predetermined period, during which rice filling operation by said rice filling device and/or sterilization operation in said sterilization chamber can be effected.

4. A system as defined in claim 1 wherein high temperature pressurized steam is intermittently flushed into said sterilization chamber for sterilization of said packed rice.

5. A system as defined in claim 4 wherein each tray of rice is subjected to a flush of high temperature pressurized steam over a period of 5 to 10 seconds that is repeated 6 to 8 times.

* * * * *